Patented July 12, 1938

2,123,224

UNITED STATES PATENT OFFICE 2,123,224

PROCESS FOR THE PRODUCTION OF SULPHUR

Hans Baehr and Walter Gross, Leuna, Germany, assignors to I. G. Farbenindustrie Aktiengesellschaft, Frankfort-on-the-Main, Germany No Drawing. Application October 16, 1935, Serial No. 45,314. In Germany October 20, 1934

6 Claims. (Cl. 23—225)

The present invention relates to a process for the production of sulphur.

As is known, by passing hydrogen sulphide through concentrated sulphuric acid, sulphur and sometimes also sulphur dioxide are formed. This reaction, however, could so far not be used on an industrial scale for the reason that it comes to a stop already after a short time when there are still large amounts of unconverted sulphuric acid present and that when applying it for example for freeing industrial gases from hydrogen sulphide sulphur dioxide, instead of the latter, passes into these gases, special means being necessary to remove it therefrom.

We have found that a continuous and at the same time complete conversion of hydrogen sulphide by means of a sulphuric acid substance is obtained by leading such a sulphuric acid substance in a finely divided or vaporized form together with hydrogen sulphide or gases containing the same over catalysts at an elevated temperature. Suitable catalysts for the process according to the present invention are for example vanadium, iron, manganese, chromium or the compounds and especially the oxides of these metals, alumina, bauxite, kaolin, silica gel etc. The reaction temperature in the catalyst preferably ranges between 180° and 500° C.

The concentration of the acid to be employed is not restricted to a narrow range, a concentration of over 50 per cent being most preferable. As sulphuric acid substances sulphuric acid itself, sulphur trioxide, fuming sulphuric acid or derivatives of sulphuric acid, such as chlorsulphonic acid may be used. The concentration of the hydrogen sulphide employed for the reaction may also be varied within wide limits. Instead of practically pure hydrogen sulphide, industrial gases containing hydrogen sulphide, such as low temperature carbonization gases, distillation gases, cracking gases or waste gases resulting from the hydrogenation may also be employed.

It is frequently preferable to perform the reaction first at a comparatively high temperature, say at between 300 and 500° C., so that it takes a very rapid course but remains incomplete, the equilibrium at the said high temperatures being an unfavorable one, and then to complete the reaction in a second step at a lower temperature, say at between 200 and 300° C. In this way very large amounts of the said reaction components may be converted practically completely in apparatus of rather small size.

The sulphur obtained may be readily separated from the water vapor formed as a by-product and from any other gases present by cooling the hot gases to somewhat above the melting point of sulphur, and withdrawn in a liquid state. The yields are nearly theoretical. The same good result is obtained also when treating with gases which are very poor in hydrogen sulphide, a fact which permits the adoption of this process for purifying the said gases from hydrogen sulphide.

The heat of the gas mixture resulting in the exothermic reaction and containing the free sulphur is rendered useful, by the application of a sulphur separator constructed as a heat exchanger, for preheating the sulphuric acid and/or the gases entering into reaction. If the amount of heat available in this way is insufficient, as for example when working with gases which are poor in sulphur, heating may be continued by burning part of the gas supplied or another combustible gas with air or oxygen and leading the combustion gases which may contain sulphur dioxide, directly into the evaporation chamber for the acid or into the reaction chamber.

The following example serves to illustrate how our present invention is carried out in practice, but the invention is not restricted thereto.

Example

Sulphuric acid of 70 per cent strength is sprayed with an amount per hour of 140 kilograms into an evaporation chamber fitted with an acid-proof lining and charged with a filler material which is equally acid-proof. The heat required for the evaporation of the sulphuric acid is supplied by burning 25 cubic meters of hydrogen sulphide with about 190 cubic meters of air in a burner opening into the evaporation chamber. The vapors escaping from the evaporation chamber are mixed with 120 cubic meters of hydrogen sulphide and led at about 300° C. over 1 cubic meter of a catalyst consisting of bauxite. The temperature of the gases which have not yet been completely converted is then lowered to about 200° C. by injecting water, the reaction being completed at this temperature by leading the gases over a second bauxite catalyst. By further cooling the gases in the sulphur separators through which they now pass sulphur having a high degree of purity is precipitated and withdrawn in a liquid state. 220 kilograms of sulphur are thus obtained per hour which output amounts to 97 per cent of the theoretical amount.

We claim:—

1. A process for the production of sulphur comprising spraying sulphuric acid into an evaporation chamber internally heated by the combustion of hydrogen sulphide with air, adding hydrogen sulphide to the gas mixture coming from the evaporation chamber, leading the resulting mixture over a bauxite catalyst at about 300° C., cooling the reaction mixture leaving the catalyst down to about 200° C., completing the reaction by means of a second bauxite catalyst at about 200° C., and separating the sulphur by cooling the reaction mixture to a temperature somewhat above the melting point of sulphur.

2. A process for the production of sulphur comprising leading a substance selected from the group consisting of sulphuric acid and fuming sulphuric acid in a finely divided form together with gases comprising hydrogen sulphide over catalysts at temperatures between about 180° and 500° C.

3. A process for the production of sulphur comprising leading sulphuric acid of more than 50 per cent strength in a finely divided form together with gases comprising hydrogen sulphide over catalysts at temperatures between about 180° and 500° C.

4. In a process as claimed in claim 3 firstly incompletely reacting the components at a relatively high temperature and then completing the reaction at a relatively low temperature.

5. A process for the production of sulphur comprising leading sulphuric acid of more than 50 per cent strength in a finely divided form at temperatures between about 180° and 500° C., together with gases comprising hydrogen sulphide over catalysts selected from the group consisting of vanadium, iron, manganese, chromium oxidic compounds thereof, oxidic compounds of aluminum, silicon and silicates of aluminum.

6. A process of removing hydrogen sulphide from industrial gases containing the same comprising leading such gases in admixture with finely divided sulphuric acid of more than 50 per cent strength over catalysts at temperatures between about 180° and 500° C. and removing the elemental sulphur formed.

HANS BAEHR.
WALTER GROSS.